United States Patent [19]

Erdmann et al.

[11] 4,399,675
[45] Aug. 23, 1983

[54] APPARATUS AND METHOD FOR SHEET METAL PART ALIGNMENT

[75] Inventors: Joachim C. Erdmann, Seattle, Wash.; Robert I. Gellert, Quesnel, Canada; Jan Jeppsson, Bellevue, Wash.

[73] Assignee: The Boeing Company, Seattle, Wash.

[21] Appl. No.: 316,390

[22] Filed: Oct. 29, 1981

[51] Int. Cl.³ .............................................. B21C 51/00
[52] U.S. Cl. ......................................... 72/37; 72/419; 72/420; 269/289 MR; 83/367; 83/371; 271/227; 198/341; 198/434; 198/782; 100/45
[58] Field of Search ........................... 72/37, 419, 420; 83/367, 371; 269/289 MR; 198/434, 341, 782; 414/677, 750; 271/226, 227, 228; 100/45

[56] References Cited

U.S. PATENT DOCUMENTS

3,910,402 10/1975 Dean .................................. 198/782

Primary Examiner—Francis S. Husar
Assistant Examiner—David B. Jones
Attorney, Agent, or Firm—Morris A. Case; B. A. Donahue

[57] ABSTRACT

A plurality of gimbal mounted wheels are located to protrude slightly above an alignment table to support a work piece. A pair of electro-optical scanners are located above the table to locate a marked bend line on the work piece with respect to a die in an adjacent press brake. The scanner signals for wheel alignment and to drive units located in each half of the alignment table to selectively drive the wheels and move the work piece bend line into position in the press brake. An alternate drive actuates the wheels when the wheels are aligned for maximum rotation.

21 Claims, 19 Drawing Figures

APPARATUS AND METHOD FOR SHEET METAL PART ALIGNMENT

BACKGROUND OF THE INVENTION

Sheet metal parts that are to be bent to shape in a press brake are usually aligned to the dies of the press brake with an outer contour of the work piece. This works very well when the bendline is parallel to the outer profile, but when that is not the case the part has to be lined up with the centerline of the punch and die using rulers and similar tools, which is time consuming.

It was determined that parts can be automatically aligned to a press brake.

SUMMARY OF THE INVENTION

An alignment table has a plurality of openings each of which has a wheel protruding through to provide a movable surface for a flat work piece. The wheels are each gimbal mounted to be swiveled from an X through a Y direction, and are grouped in sections with selective varying alignment between sections and common alignment within each section. A drive system consisting of a series of driven parallel shafts are mounted to the underside of the table. Each shaft has a series of spaced-apart disks mounted thereon. Each wheel is located to move against and to be driven by one of the disks when the wheels are in the extreme of the X or the extreme of the Y position. The drive system is divided into two halves with a right side drive and a separately controlled left side drive. A pair of electro-optical scanners determine the work part position with respect to the forming dies in a press brake and initiate signals to swivel the wheels and control the drive system. An alternate drive system moves up into contact with and drives the wheels when the wheels are swiveled into a position for rapid rotation about a virtual pivot point on the brake press die centerline.

DETAILED DESCRIPTION

Figure 1:
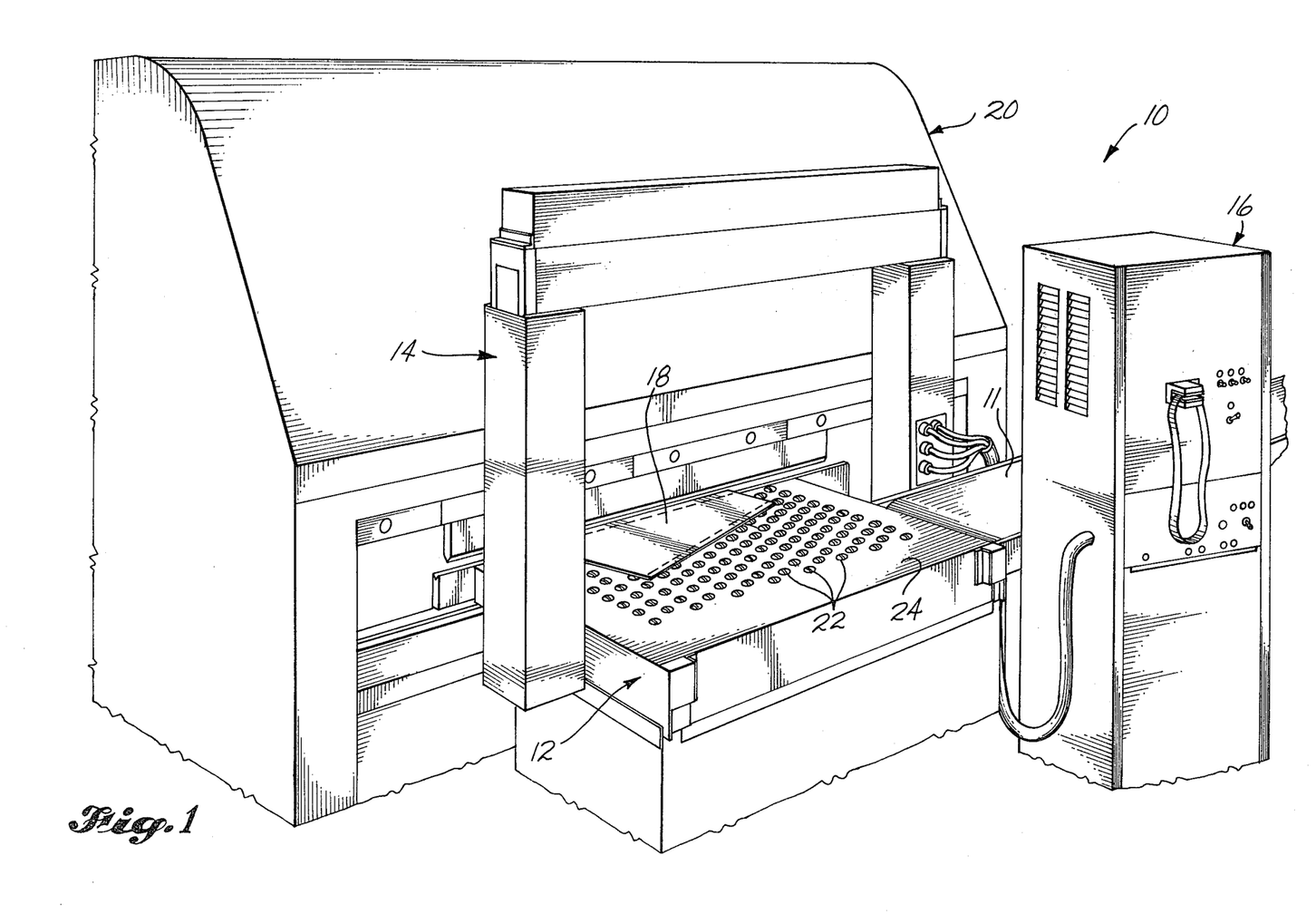
FIG. 1 shows a perspective view of this invention.
Figure 2:
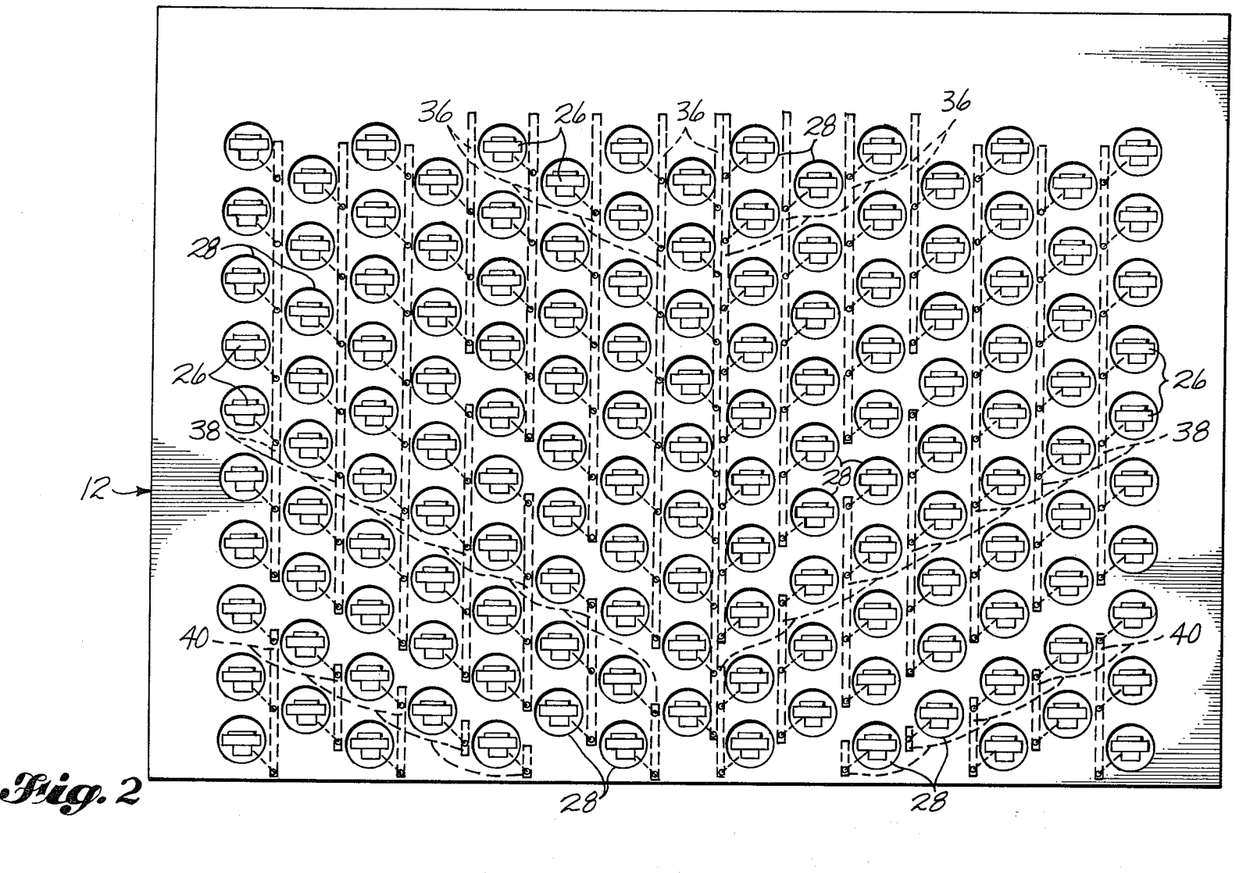
FIG. 2 shows a plan view of wheel alignment for this invention with the wheels aligned in an X position.
Figure 3:
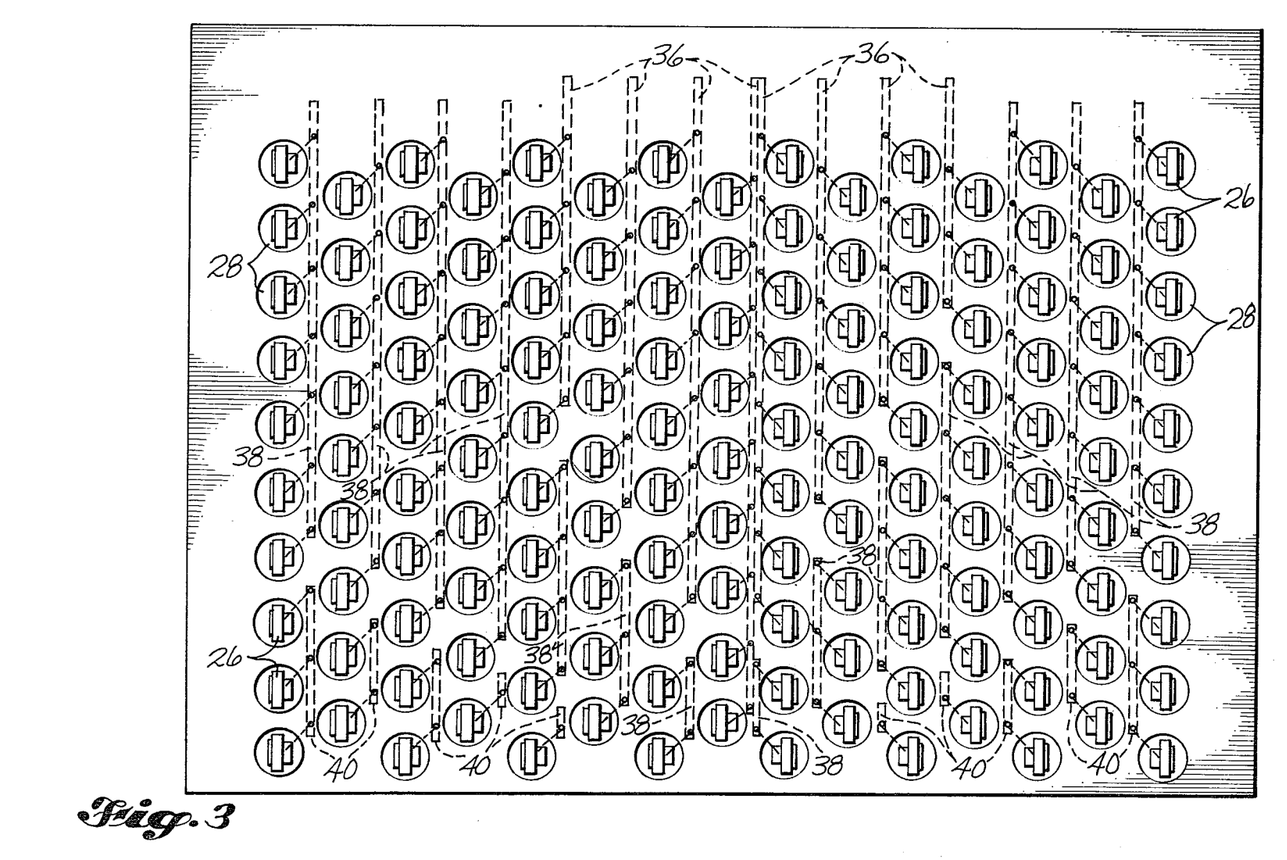
FIG. 3 shows a plan view of wheel alignment with the wheels in a Y position.
Figure 4:
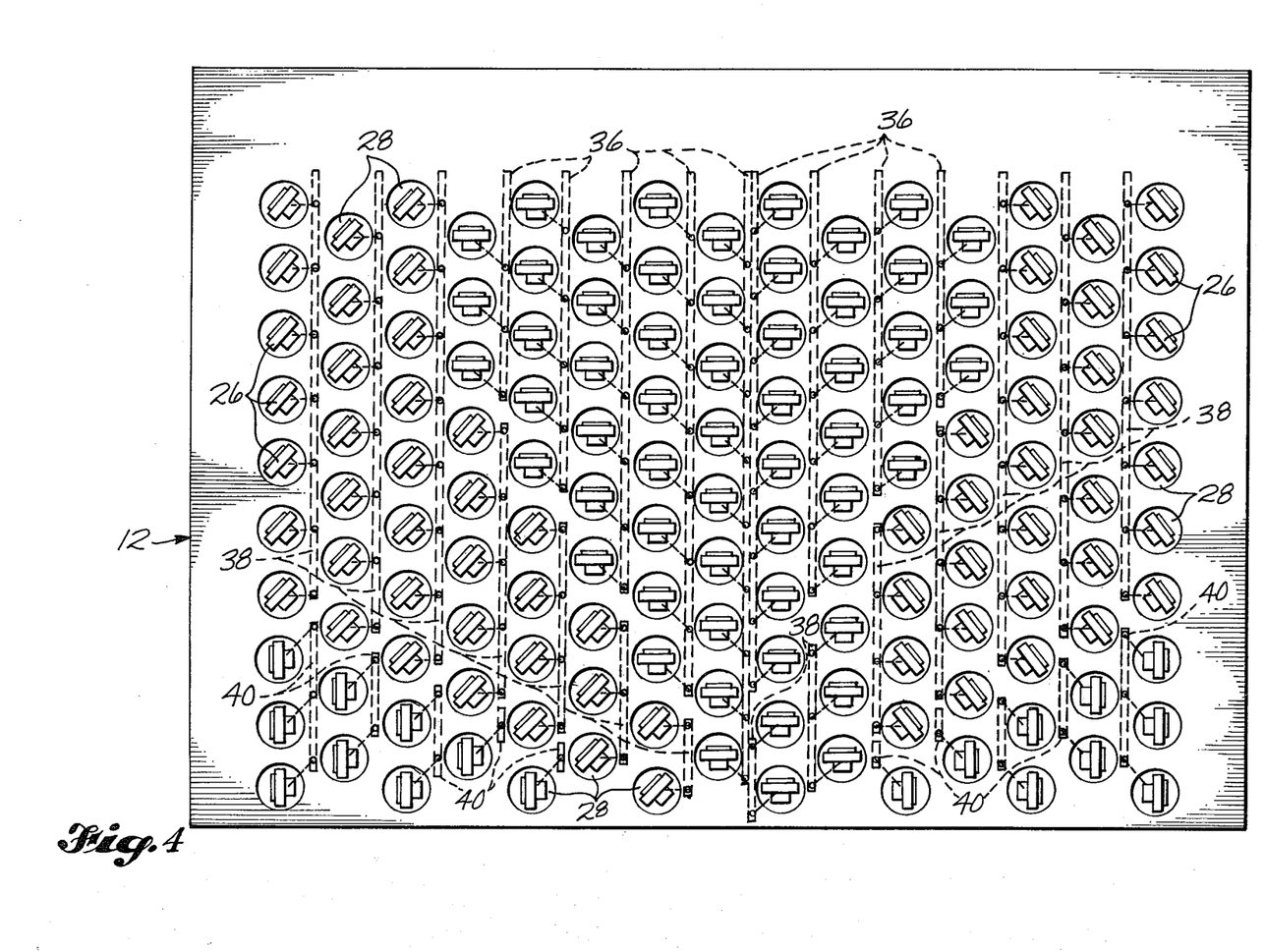
FIG. 4 shows a plan view of wheel alignment with the wheels in position for providing maximum rotation.

An alignment machine 10, has a feed conveyor 11, an alignment table 12, electro-optical scanner 14, and a numerical control unit 16 to provide automatic feed of sheet metal work piece 18 into press brake 20. The alignment table has a plurality of holes 22 arranged in a grid pattern through tabletop 24. Each hole has a rotatable wheel 26 mounted below the table that extends slightly above the table top to in combination provide a surface to support the work piece. Each wheel is mounted to a gimbal 28, which can rotate around a vertical axis, and is held by washers 30 which in turn are secured by bolts 31 to the table. The gimbal permits the wheel to be swiveled through 90 degrees to be aligned from an X through a Y direction. FIG. 2 shows the wheels all aligned in an X direction, FIG. 3 shows the wheels aligned in a Y direction, and FIG. 4 shows the wheels selectively swiveled to provide maximum rotation to the work piece.

Two identical alignment tables 12 are used. One is as shown and the other one, now shown, is located on the other side of the press brake. The optical system 14 provides control signals for both tables.

Figure 5:
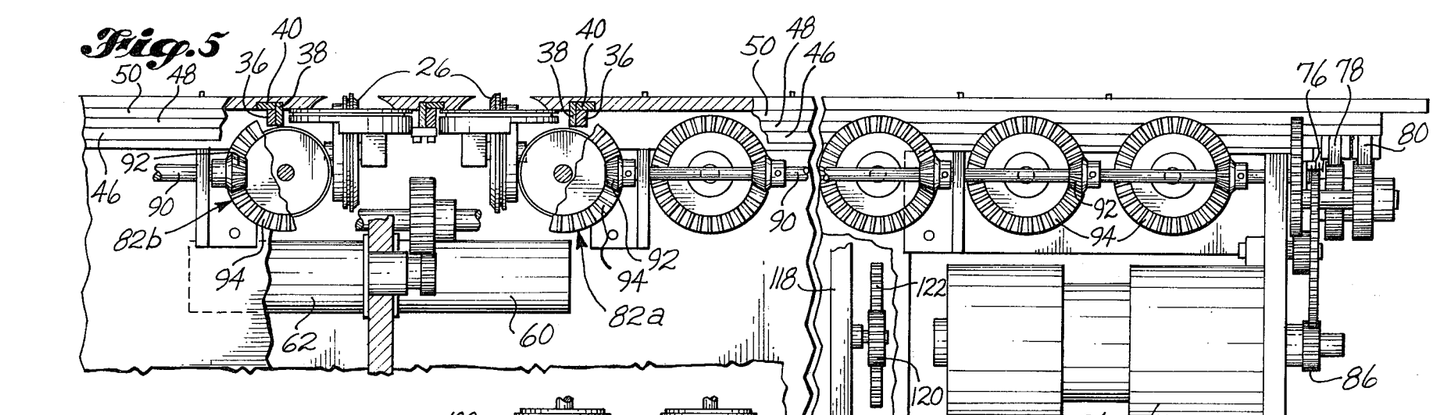
FIG. 5 shows a fragmented side elevational view of the drive for the alignment table of this invention.
Figure 6:
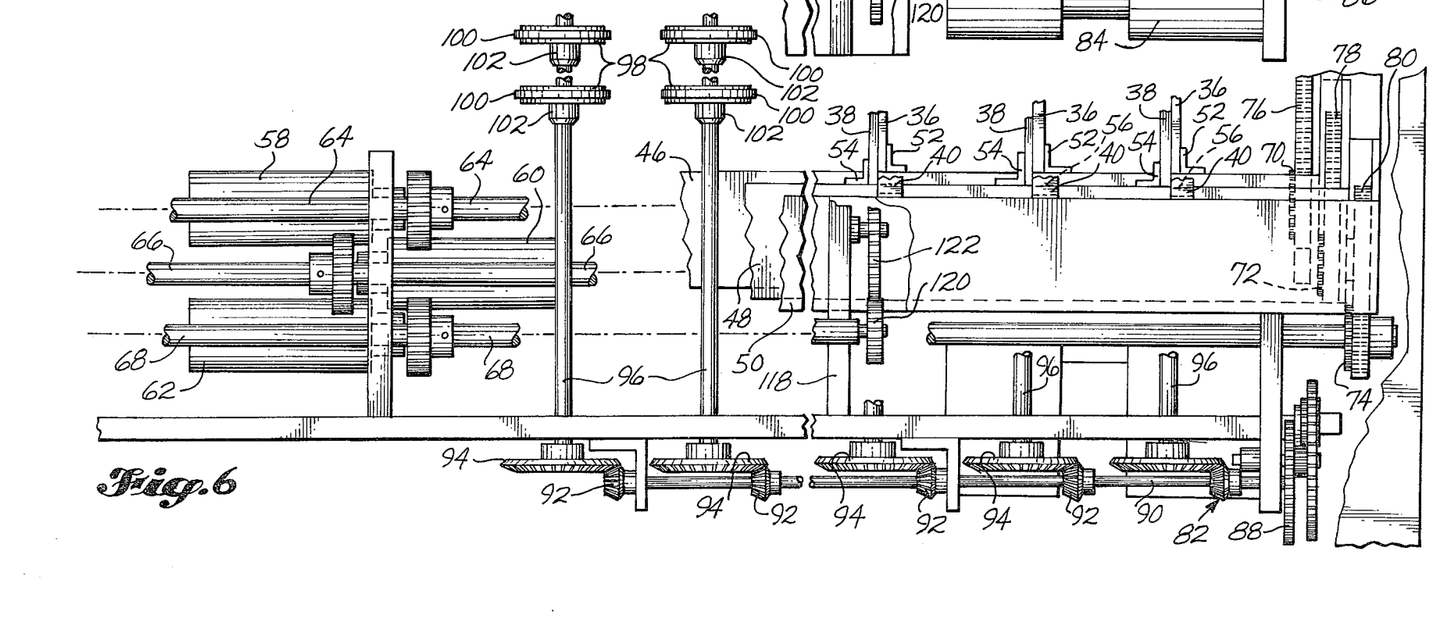
FIG. 6 shows a fragmented plan view of FIG. 5.
Figure 7:
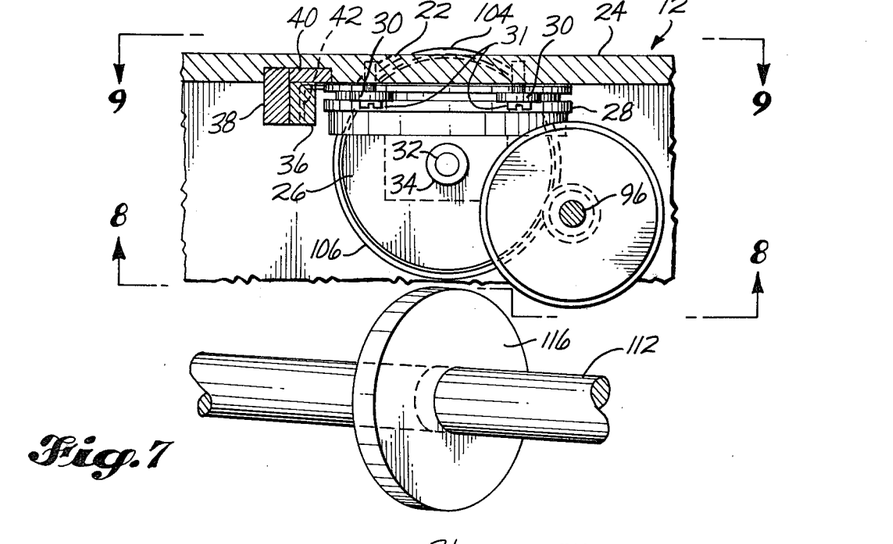
FIG. 7 shows a fragmented side elevational view of a typical wheel in the X position along with the drive for that wheel.
Figure 8:
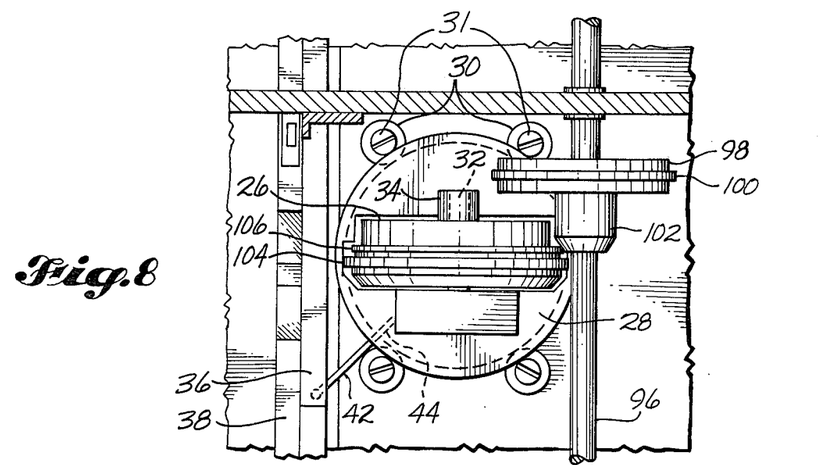
FIG. 8 shows a sectional view taken along line 8—8 of FIG. 7.
Figure 9:
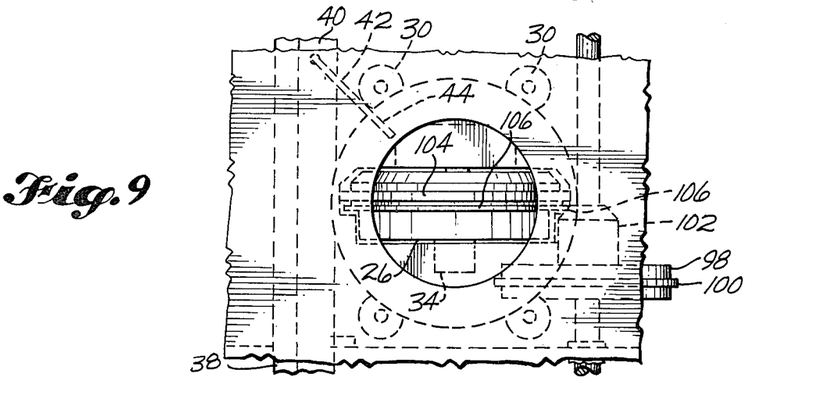
FIG. 9 shows a sectional view taken along line 9—9 of FIG. 7.
Figure 10:
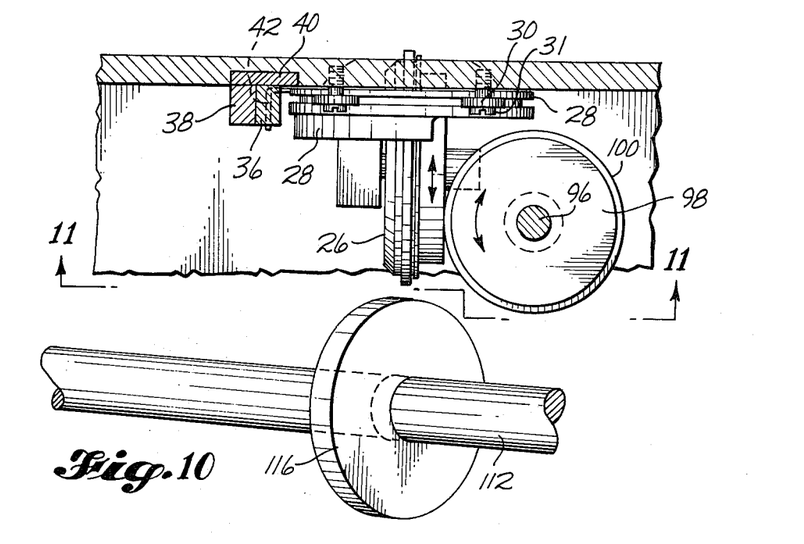
FIG. 10 shows the view of FIG. 7 with the wheel in the Y position.
Figure 11:
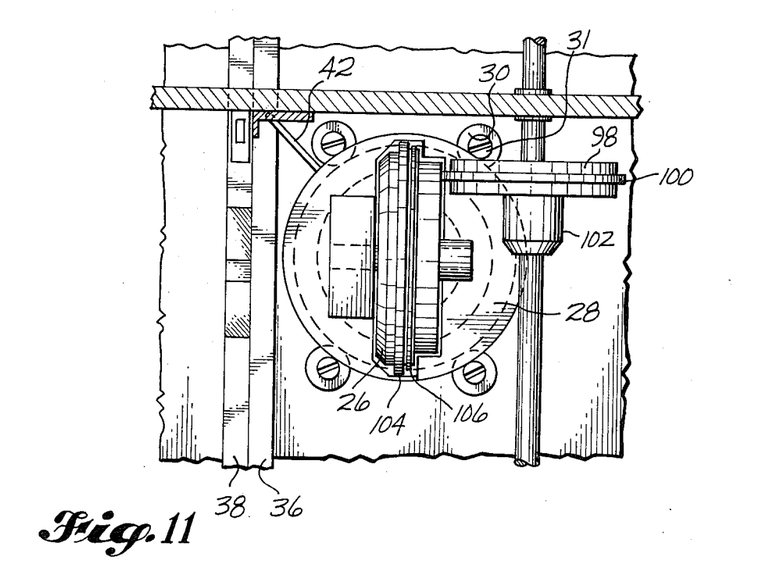
FIG. 11 shows a sectional view taken along line 11—11 of FIG. 10.
Figure 12:
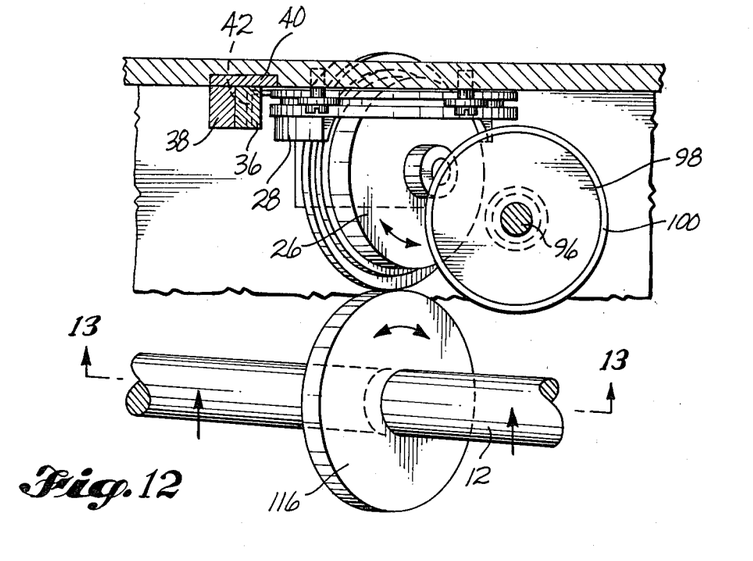
FIG. 12 shows the view of FIG. 7 with the wheel rotated to a 45 degree angle for maximum rotation.
Figure 13:
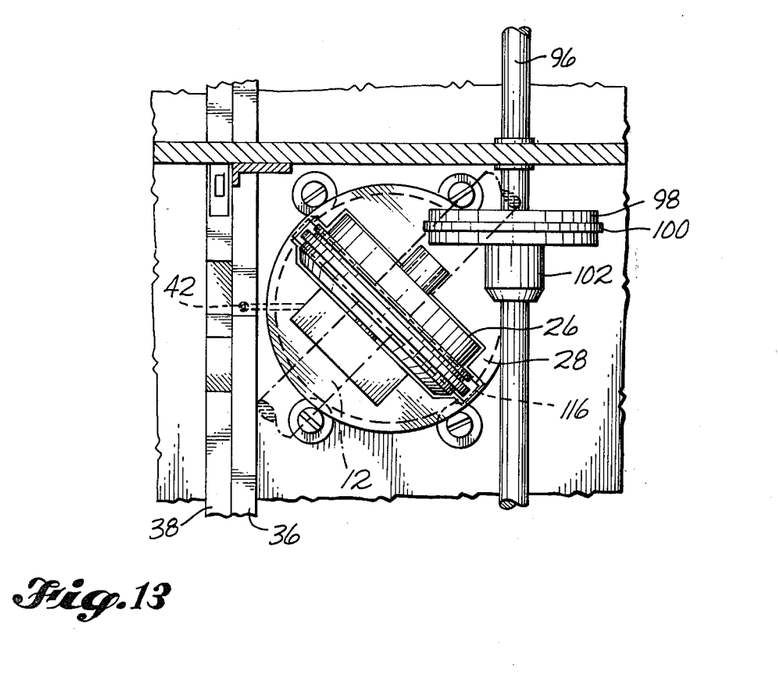
FIG. 13 shows a sectional view taken along line 13—13 of FIG. 12.

FIGS. 7 through 13 show a typical wheel 26 in various stages of alignment. In FIGS. 7 through 9 it is aligned in an X direction; in the Y direction in FIGS. 10 and 11, and at an angle of 45 degrees in FIGS. 12 and 13. The wheel is rotatably mounted to the gimbal 26 with rod 32 and bearing 34. The wheels are swiveled between the various alignment positions by reciprocally movable and independently movable parallel rods 36, 38 and 40. An L shaped pin 42 is pivotally mounted to the rod and extends into a slot 44 in the gimbal to swivel the gimbal with wheel as the rod moves. The rods are all parallel and are arranged to control the wheels in various areas. The first area is a centrally located pie shape pointed toward the centerline of the press brake. All of the wheels in that area are controlled by rods 36. The second and third areas are pie-shaped areas adjacent the press brake, are pointed toward each other and are controlled by rods 40. The fourth and fifth areas are modified pie shaped, located between the other areas, are essentially pointed toward the centerline of the press brake at an angle of about 45 degrees, and are controlled by rods 38. Each same numbered rod is connected to a plate, as best shown in FIGS. 5 and 6, with rods 36, 38 and 40 respectively joined to plates 46, 48, and 50 by angle irons 52, 54 and 56. The plates are individually driven by servo-motors 58, 60 and 62; which act through gearing to drive rods 64, 66 and 68 respectively. Those rods extend both ways to rotate pinion gears 70, 72 and 74; which in turn act upon racks 76, 78 and 80. A set of those racks and pinions are located on each end of the drive shafts with the racks joined to the plates.

The drive system 82 for the wheels 26 is best shown in FIGS. 5 and 6. The drive system, actually made up of two separate matching systems 82a and 82b, each provide a drive for one-half of the wheel. Each system has a servo-motor 84 with gears 86 acting through intermediate gearing to rotate gear 88 which is connected to drive shaft 90. A series of bevel gears 92 are joined to the drive shaft to drive mating gears 94, each of which connects to a drive shaft 96. Each of these drive shafts have a plurality of mounted disks 98, each having a circumferentially located resilient ring 100 and a shaped hub 102. The disks are spaced apart to the located adjacent one of the wheels. The wheels each have a pair of circumferentially located resilient 104 and 106. The larger ring 104 comes in contact with the work piece 18 to impart direction to that work piece, and the smaller ring is located to contact the hub 102 of the disk 98 to permit driving the wheel when the wheel is in the X position. See FIG. 8. The wheel is contacted by and driven by the resilient ring of the disk when the wheel is in the Y direction. Slight rotation away from either the X or the Y direction moves the wheel out of contact with the primary drive system.

Figure 14:
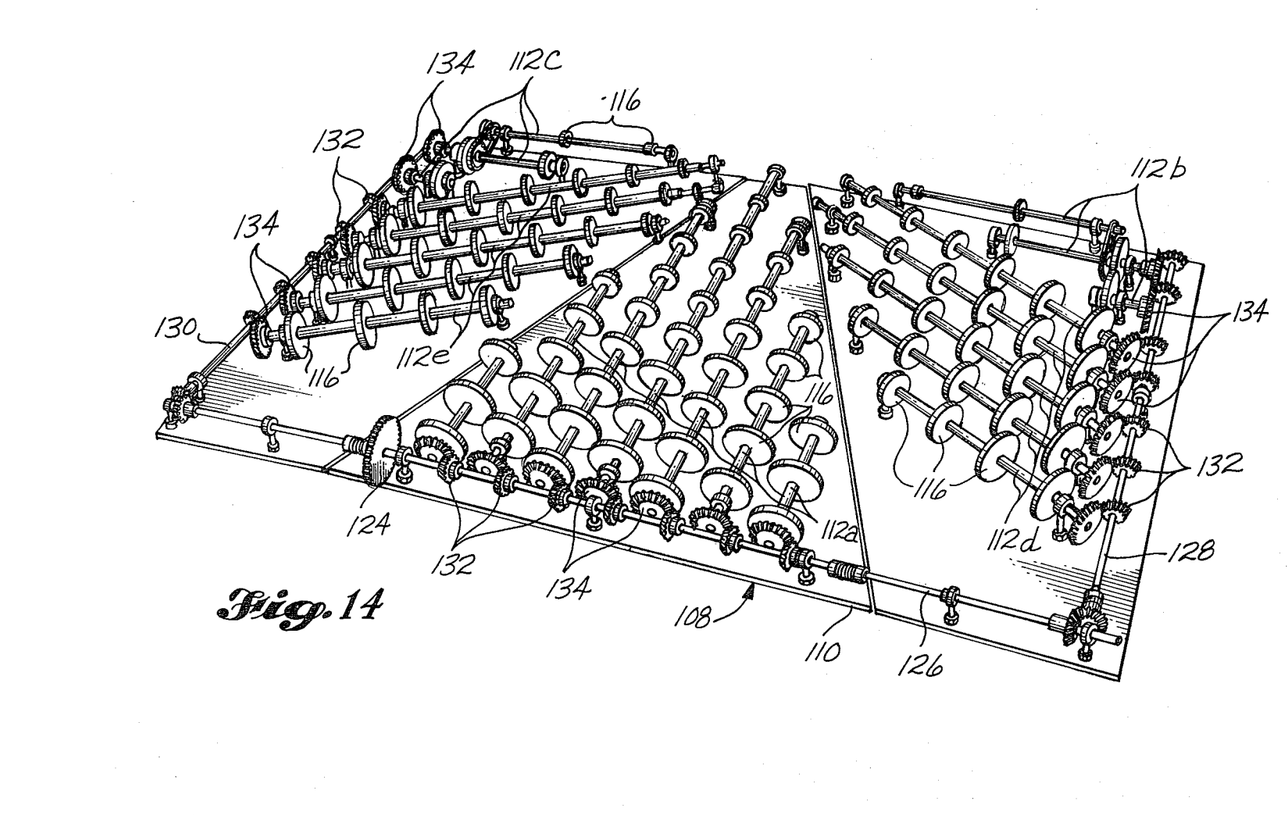
FIG. 14 shows a perspective view of the alternate drive system for the wheels.
Figure 15:
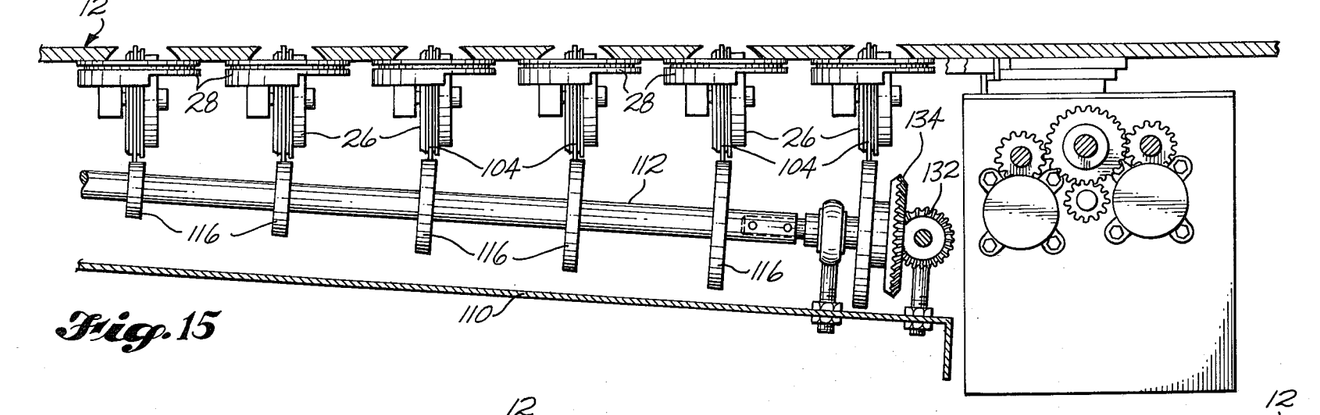
FIG. 15 shows a fragmented side elevational view of a row of wheels being contacted by the alternate drive system.

FIG. 14 shows an alternate drive system 108. That system uses a support member 110 approximating the size of the alignment table 12. Mounted to the support member are a number of drive shafts 112 each generally directed toward a rotational pivot point centered 114, see FIG. 18, on the press brake with each shaft having a number of spaced apart disks 116 that decrease in diameter as the shaft approaches the pivot point. The drive shafts are arranged in patterns with parallel shafts 112a in the first area in a centrally located pie shape, parallel shafts 112b and parallel shafts 112c adjacent and parallel to the press brake, and parallel shafts 112d and parallel 112e each aligned at about 27 degrees with respect to the press brake. The drive shafts 112 are all driven simultaneously with a common drive system. FIGS. 5 and 6 show a servo-motor 118 mounted to the alignment table 12 which motor provides the power. That motor has gear 120 which meshes with a larger diameter gear 122. This gear in turn meshes with another large gear 124. Connected to this gear is a drive shaft 126 which in turn is geared to drive shafts 128 and 130. All three of these shafts each has a plurality of gears 132 located to mesh with a plurality of gears 134 located on the outer end of each 112 drive shaft.

Figure 16:
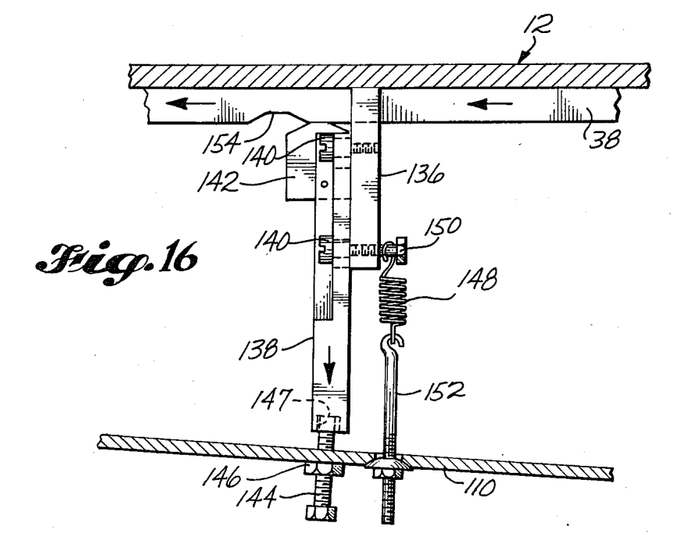
FIG. 16 is a fragmented side elevational view showing one of a series of spacers for the alternate drive system with the spacer holding the alternate drive away from the wheel as shown in FIG. 7.
Figure 17:
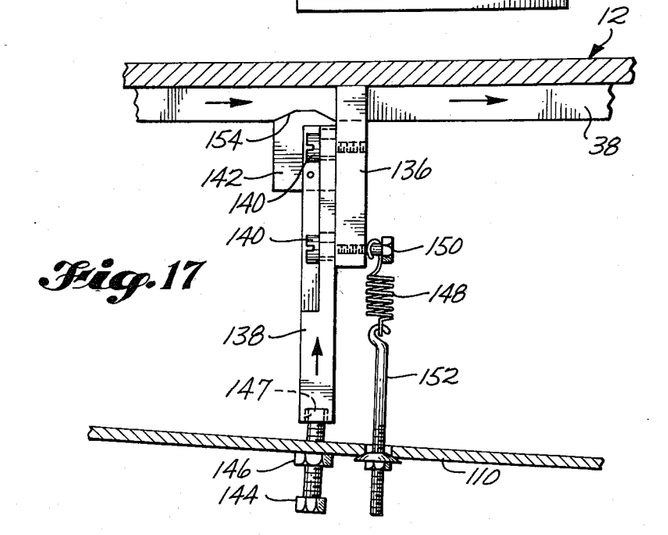
FIG. 17 is a fragmented side elevational view as in FIG. 16 with the spacer allowing the alternate drive to contact the wheels as in FIG. 15.

The support member 110, as part of the alternate drive system 108, is mounted from a plurality of support locations below the alignment table 12 in a manner to permit raising the support member to bring disks 116 into alignment with resilient rings 106 of wheels 26 to drive those wheels. FIGS. 16 and 17 show a typical support location for the support member. A stud 136 is joined directly to the underside of the alignment table. A bar 138 is secured to the stud with screws 140 in a manner to permit reciprocal movement of the bar toward and away from the alignment table. A tapered head 142 is secured to the upper end of the bar with the tapered part contacting rod 38. A bolt 144 threads into the support member and a nut 146 permits a locking adjustment. The upper end of the bolt fits into a small pocket 147 in the lower end of the bar 138. The support member is continually urged upward by a spring 148, one end of which is secured by a bolt 150 to the stud and the other end is joined to an adjustable fastener 152 that is secured to the support member. Rod 38 has a tapered slot 154 that is sized to accept the tapered head on the end of the bar. This tapered slot is located to be directly over the tapered head when the rod 38 is moved to a position to align the wheels at a 45 degree angle. When the tapered head is contacting the rod, bolt 144 is adjusted to keep disks 116 away from the wheels, but when the tapered head is resting in the tapered slot all the disks are contacting and driving the wheels. This alternate drive is used when the wheels are aligned for maximum rotation of the work piece 18 with the wheels arranged as in FIG. 4 for maximum rotation about pivot point 114. When in that alignment, the wheels seeming to be in the X, and the wheels seeming to be in the Y position are slightly turned from those positions to move the wheels out of contact with the drive hubs 102 and disks 100 of the primary drive system and the wheels are all driven by the alternate drive system 108.

Figures 18, 19:
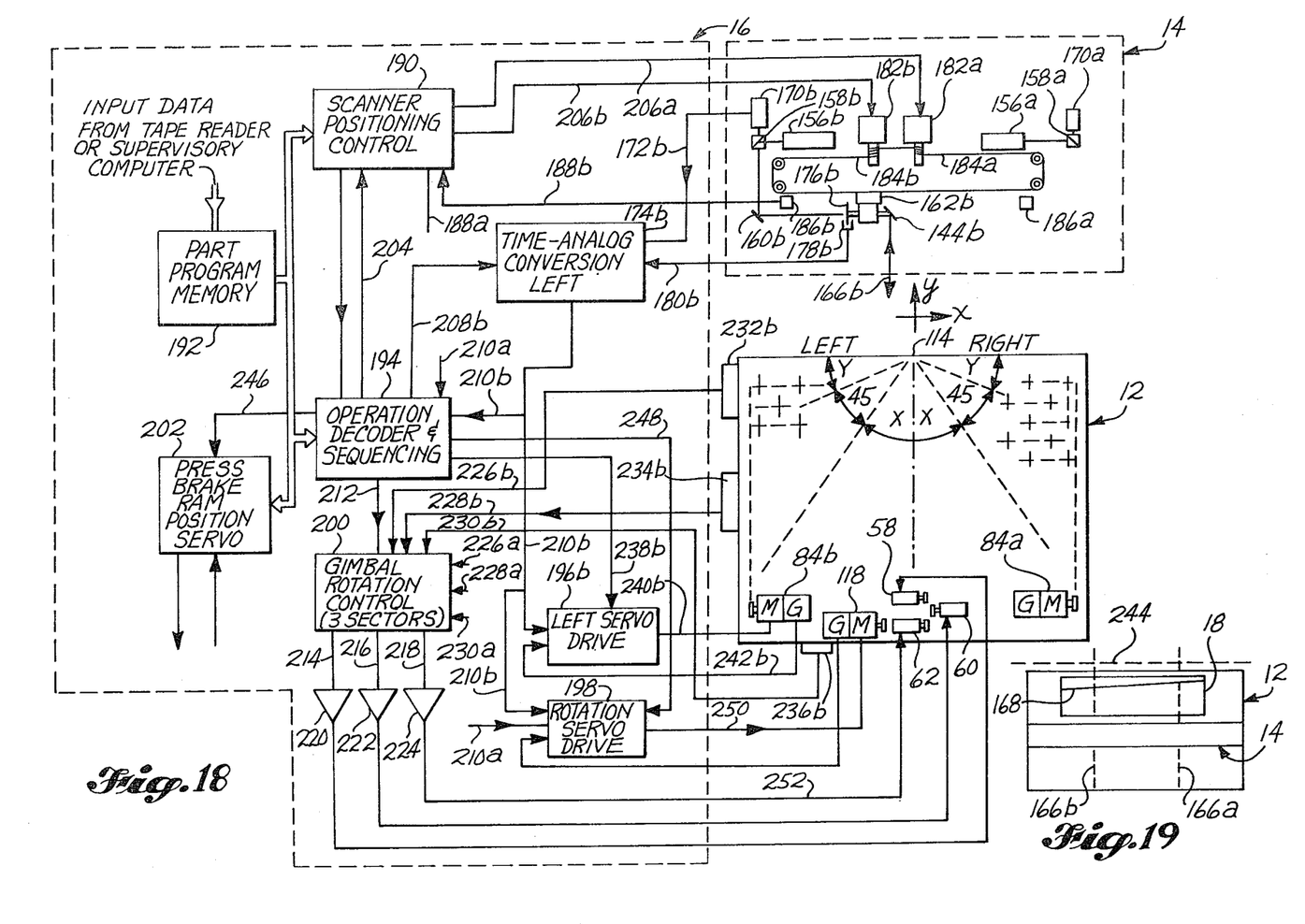
FIG. 18 shows a block diagram of the controls for this invention.
FIG. 19 shows a schematic of the alignment table with electro-optical scanner.

Controls for the alignment are shown as a block diagram in FIG. 18. Only the left half of that diagram is shown completely; however, the right half is built symmetrically for those units having a letter following the identification number. The electro-optical scanner unit 14 has lazer units 156a and 156b, which respectively send a beam of collimated light into beam splitters 158a and 158b. These splitters cause 50% of the light to be reflected downward at 90 degrees and 50% to continue without deflection. The deflected beam is again deflected at 90 degrees by plane mirrors 160a and 160b, continues through a hollow shaft in scanner motors 162a and 162b and into 45 degrees prisms 164a and 164b which deflect the beam at 90 degrees so that it will rotate in a plane perpendicular to the motor shaft where it will scan over work piece 18 with light traces 166a and 166b as best shown in FIG. 19. In that figure the work piece has been previously marked with retroreflective paint along bend line 168. When each light trace strikes the bend line, light is reflected back along the path it originally took until it reaches the beam splitters 158a and 158b where 50% of the light will enter and trigger light response detectors 170a and 170b. Those detectors will trigger and send detector pulses 172a and 172b to time analog conversion units 174a and 174b. The scanner motor has a disk with narrow slots 176a and 176b. Electro-optical detectors 178a and 178b are located to initiate pulses 180a and 180b when the slot is in a referenced position, and this pulse is sent to the time analog conversion units to provide a comparative pulse between the desired position for the bend line and the actual position. The scanner motors are mounted to permit adjustment to handle different work pieces. The motors are positioned by stepper motors 182a and 182b acting through cables 184a and 184b, and end position sensor switches 186a and 186b are located to be a starting reference point when contacted by the scanner motors and to initiate reference pulses 188a and 188b that are sent to a scanner position control unit 190.

In operation, a work piece 18 has a bend line marked on the piece in reflective point 168. The work pieces are then placed on a conveyor 11 and transferred onto alignment table 12. The numerical control unit 16 has a part program memory unit 192 which holds necessary information to perform alignment and bends on the part. This information is transmitted to an operation decoder and sequencing unit 194; which in turn will, at the proper time, send control signals to the scanner position control unnit 190, the time analog conversion units 174a and 174b, to right and left servo drive units 196a and 196b, to a rotation servo drive unit 198, to a gimbal rotation control unit 200, and to a press brake ram position servo unit 202. The signal 204 sent from the operation decoder and sequencing unit sets out the desired scanner positions and signals are sent over lines 206a and 206b to actuate the stepper motors and position the scanner motors. Next signals 208a and 208b go to the time analog conversion units and govern the marking of bend location to use if the part has more than one marking. The time analog conversion units compare desired versus actual locations of the bend line on the part from the 172a and b and the 180a and b signals and initiate error marking signals 210a and 210b. One of the places that signal feeds back to is the operation decoder sequencing unit; which in turn sends a signal 212 to the gimbal rotation control unit 200. That unit will send control signals 214, 216 and 218 through power amplifiers 220, 222 and 224 to the respective servo motors 58, 60 and 62 to arrange the rotatable wheels 26 mounted in the gimbals 28 into one of the patterns shown in FIGS. 2, 3 and 4. Feedback signals 226 and 226b, 228a and 228b and 230a and 230b emanating from respective optoelectronic switches 232a and 232b. 234a 234b and 236a and 236b provide the signal for stopping swiveling when the wheels are in the desired sequenced position. When the wheels are in the X or the Y positions, signals 238a and 238b are sent from the operation decoder and sequencing unit 194 to the servo drives 196a and 196b; those signals are compared with signals 210a and 210b, and the wheels are driven by the primary drive system consisting of the right side drive system 82a and the left side drive system 82b. These drive systems each drive wheels over their half of the alignment table by servo motors 84a and 84b respectively. All the wheels in each half are driven at the same speed with each drive motor driven at a rate proportional to a rate command signal 240a or 240b. Each of these motors is of the motor-generator type and acts as a feedback transducer to send a rate feedback signal 242a or 242b which is compared with the rate command and the difference is amplified and applied to the motor to move the part with the painted bend line 168 over the center of the line of the die 244 at which location the drives are stopped. Next a signal 246 is sent from the operation decoder and sequencing unit to the press brake ram position servo 202, at which time the press brake bends the work piece. When sensing to the operation decoder and sequencing unit calls for maximum rotation of the work piece, the wheels are aligned as in FIG. 4, the alternate drive system moves up to contact and drive the wheels and a signal 248 is sent to the rotation servo drive unit 198, which compares that signal with the marking error signals 210a and 210b from the time analog conversion units 174a and 174b and sends a signal 250 to the servo motor 84b. That motor which is of the motor-generator type acts as a feedback transducer to send a rate feedback signal 252 which is compared with the rate command to stop the motor when the work piece bend line is located over the center of the line of the die. Once the bend line marking is in proper position, the press brake is actuated to bend the part.

We claim:

1. An apparatus for automatically aligning a sheet metal work piece to a press brake, with the apparatus comprising: a plurality of wheels in a dense grid pattern protruding slightly through the top surface of an alignment area; means for selectively swiveling the wheels from an X through a Y direction; a series of driven disks in a first half of the alignment area to be contacted at the extreme wheel positions to drive the wheels in that alignment area; a series of driven disks in a second half of the alignment area to be contacted at the extreme wheel positions to drive the wheels in that alignment area; optical means for measuring a sheet metal work piece location with respect to a press brake, in the first half of the alignment area and for directing drive movement at that area; and optical means for measuring the sheet metal work piece location, with respect to the press brake, in the second half of the alignment area and for directing drive movement in that area to locate a bend line of the sheet metal work piece with respect to the press brake.

2. An apparatus for automatically aligning a sheet metal work piece as in claim 1, with the apparatus further comprising alternate means for driving the wheels to impart rapid rotational movement to the work piece.

3. An apparatus for automatically aligning a sheet metal work piece to a press brake, with the apparatus comprising: a first series of driven parallel shafts with each shaft having a plurality of spaced apart disks, means for controlling rotation and the speed of rotation of the shafts, a second series of driven parallel shafts located alongside the first series of shafts and with each shaft in the second series having a plurality of spaced apart disks, means for controlling rotation and the speed of rotation of the second series of shafts, a plurality of wheels in a dense pattern protruding slightly through the top surface of an alignment table, means for swiveling the wheels from an X through a Y direction with the wheels located to be contacted by the driven disks when in the extreme positions, and electro-optical means for scanning in each of two halves of the alignment table for measuring a sheet metal work piece bend line location with respect to a punch press die and for actuating wheel alignment and disk drives to move the work piece into alignment in the punch press.

4. An apparatus for automatically aligning a sheet metal work piece as in claim 3 further comprising: the means for swiveling the wheels consisting of a plurality of gimbals with each wheel mounted to the underside of the alignment table, a separate pin to extend into an opening in each gimbal with an other end of each pin swivelly mounted to one of the parallel rods, and reversible servo-motors mounted to be actuated in response to a signal from the electro-optical scanner to selectively drive the rods.

5. An apparatus for automatically aligning a sheet metal work piece as in clam 3 further comprising: means for selectively swiveling the wheels to impart rotational movement to the work piece about a central pivot point on the line of the die in the press brake, and means for providing an alternate drive to the rotationally aligned wheels.

6. An apparatus for automatically aligning a sheet metal work piece as in claim 5 with the alternate drive having means for providing a turn rate to the individual wheels that is proportional both to the distance from the pivot point and to the rotational error measured by the optical system.

7. An apparatus for automatically aligning a sheet metal work piece as in claim 5 wherein the means for providing an alternate drive comprises: a support member approximating the size of the alignment table, a plurality of driven shafts each generally directed toward the rotational pivot point with each shaft having a plurality of spaced apart disks that decrease in diameter as the shaft extends toward the pivot point with the drive shafts arranged in a pattern covering five areas on the support member with a first area having parallel shafts in a centrally located pie shaped area pointed toward the press brake, a second and third area each having parallel shafts adjacent and parallel to the press brake, and adjacent intermediate fourth and fifth areas each having parallel shafts that are aligned at about 27 degrees with respect to the press brake, and means for moving the support member for bringing the disks on the driven shafts into aligned contact with the positioned wheels.

8. An apparatus for automatically aligning a sheet metal work piece as in claim 7 wherein the means for moving the support member with driven shafts comprises resilient means urging the support member toward the underside of the alignment table, a plurality of support bars to keep the support member from moving upward in response to the resilient means, and means for moving the ends of the support bars in response to the wheel swiveling means to permit the resilient means to raise the support member when the swiveling means move the wheels to the rotational position.

9. An apparatus for automatically aligning a sheet metal work piece to a press brake as in claim 3 wherein the electro-optical means comprises: a scanner to signal the position of the line of the punch press die, a laser beam directed light trace to reflect back through the scanner from a mark that indicates the bend line in the first half of the work piece to signal the location of the bend line, a scanner to signal the position of the line of the punch press die, a laser beam director light trace to reflect back through the scanner from the mark that indicates the bend line in the second half of the work piece to signal the location of the bend line, means for comparing the signals and for directing the compared signals to the means for actuating wheel alignment and actuating the disk drives.

10. An apparatus for automatically aligning a sheet metal work piece to a press brake as in claim 5 wherein the electro-optical means comprises: a scanner to signal the position of the line of the punch press die, a laser beam directed light trace to reflect back through the scanner from a mark that indicates the bend line in the first half of the work piece to signal the location of the bend line, a scanner to signal the position of the line of the punch press die, a laser beam directed light trace to reflect back through the scanner from the mark that indicates the bend line in the second half of the work piece to signal the location of the bend line, means for comparing the signals and for directing the compared signals to the means for actuating wheel alignment and actuating the disk drives and the alternate drive system.

11. An apparatus for automatically aligning a sheet metal work piece to a press brake, with the apparatus comprising: an alignment table, a plurality of parallel drive shafts each having a plurality of disks with hub secured to a first half of an underside of the table, a reversible speed controllable servo-motor driving the drive shafts, a plurality of parallel drive shafts each having a plurality of disks with hub secured to a second half of the underside of the table, a reversible speed controllable servo-motor driving the second series of drive shafts, a plurality of wheels each protruding slightly through the top surface of the alignment table with each wheel pivotally mounted on a gimbal, a series of parallel alignment rods mounted to the alignment table to move reciprocally with the rods grouped to cover a fist pie-shaped area pointing toward a press brake, a second grouping of two essentially pie-shaped areas pointing toward each other and located adjacent the press brake, and a third grouping of two essentially pie-shaped areas located between the other areas with each pointing toward a centerline of the press brake, an independent drive means for actuating the alignment rods in each of the three area groups, means actuated by the alignment rods for swiveling the wheels between an X direction and a Y direction of alignment with the wheels contacting the disks when aligned at one extreme and contacting the hubs when aligned at the other extreme, electro-optical means for scanning in each of the two halves of the alignment table with respect to the punch press die and for actuating the alignment rods and the disk drives to move the work piece into alignment in the punch press.

12. An apparatus for automatically aligning a sheet metal work piece to a press brake as in claim 11 further comprising: means for selectively swiveling the wheels to impart rotational movement to the work piece about a pivot point centrally located on the line of the die with the wheels at the extremes slightly turned from the X direction and from the Y direction to move the wheels out of contact with the driven disks and hubs, and means for providing an alternate drive system to contact and drive the rotationally aligned wheels.

13. An apparatus for automatically aligning a sheet metal work piece to a press brake as in claim 12, wherein the means for providing an alternate drive system comprises: a support member approximating the size of the alignment table, resilient means urging the support member toward the underside of the alignment table, a plurality of spacer rods to extend between the support member and the alignment rods to control the distance between the support member and the alignment table, driven rods secured to the support member with the rods arranged in groups to correspond to the groups into which the alignment rods are arranged and within each group all the rods are parallel to each other and have disks on the rods that decrease in diameter as the rods approach the pivot point on the die of the press brake, means for driving all the rods on the support member, and means for allowing movement of the spacer rods when the wheels are in the rotation position to permit the support member to move toward the alignment table and contact the wheels with the disks of the alternate drive system to rotate the work piece and properly position it in the press brake.

14. An apparatus for automatically aligning a sheet metal work piece to a press brake as in claim 11, wherein the electro-optical means comprises: a laser beam directed through a scanner motor to place a light trace onto a first half of the work piece, a laser beam directed through a scanner motor to place a light trace onto a second half of the work piece, means for reflecting the light trace from each of the two beams off the work piece marked bend line to compare those traces with the line of the die in the press brake and send the compared signals to the motors actuating the alignment rods and the drive disks.

15. An apparatus for automatically aligning a sheet metal work piece to a press brake as in claim 12, wherein the electro-optical means comprises: a laser beam directed through a scanner motor to place a light trace onto a first half of the work piece, a laser beam directed through a scanner motor to place a light trace onto a second half of the work piece, means for reflecting the light trace from each of the two beams off the work piece marked bend line to compare those traces with the line of the die in the press brake and send the compared signals to the motor actuating the alignment rods, and the alternate drive system.

16. An apparatus for automatically aligning a sheet metal work piece to a press brake, with the apparatus comprising: a plurality of wheels in a dense grid pattern protruding slightly through the top surface of an alignment area, means for determining the location of a marked work piece bend line in a first half of the alignment area with respect to a die line in a press brake, means for determining the location of the marked work piece bend line in a second half of the alignment area with respect to the die line in the press brake, and means for signalling the compared location of the work piece bend line into a means for selectively swiveling the wheels from an X through a Y direction and into means for separately driving the wheels in each half of the alignment area to move the work piece and place the bend line into alignment in the press brake.

17. An apparatus for automatically aligning a sheet metal work piece to a press brake as in claim 16 with the apparatus further comprising alternate means for driving the wheels when the wheels are aligned for maximum rotation about a central pivot point on the die line of the press brake.

18. A method of aligning a sheet metal work piece to a press brake, with steps comprising: advancing a sheet metal work piece onto an alignment table, determining the position of the work piece with respect to a desired position over a die located in an adjacent press brake, selectively swiveling a plurality of wheels that protrude above the top surface of the alignment table for moving the work piece into the desired location, selectively powering the wheels in each of two halves of the alignment table area with drive units secured to the underside of the alignment table for moving the work piece into the forming position in the press brake.

19. A method of aligning a sheet metal work piece to a press brake as in claim 18, with further steps comprising: swiveling the wheels out of contact with the underside drive units and into position to impart a rotational movement about a pivot point on the line of the die in the punch press, and raising a support member with alternate drive units up against the underside of the wheels for moving the work piece into aligned position on the press brake.

20. A method of aligning a sheet metal work piece to a press brake, with steps comprising: marking a bend line on a sheet metal work piece, advancing the marked work piece onto an alignment table, directing a light beam onto a first half of the alignment table and reflecting the beam back from the mark, directing a light beam onto a second half of the alignment table and reflecting the beam back from the mark, comparing the reflected beams with a die line located in an adjacent press brake, and sending the compared signal for directing controlled swiveling of a plurality of wheels that protrude above the top surface of the alignment table and for directing movement of a separate drive means for each half of the alignment table for rotating the wheels and moving the marked line on the work piece onto the line of the die in the press brake.

21. A method of aligning a sheet metal work piece to a press brake, with steps comprising: driving the wheels with an alternate drive unit when the wheels are aligned to impart a rotational movement about a pivot point on the line of the die in the punch press.

* * * * *